C. W. FOWLER.
VALVE FOR INTERNAL COMBUSTION ENGINES.
APPLICATION FILED MAY 7, 1912.
1,117,020.
Patented Nov. 10, 1914.
2 SHEETS—SHEET 1.
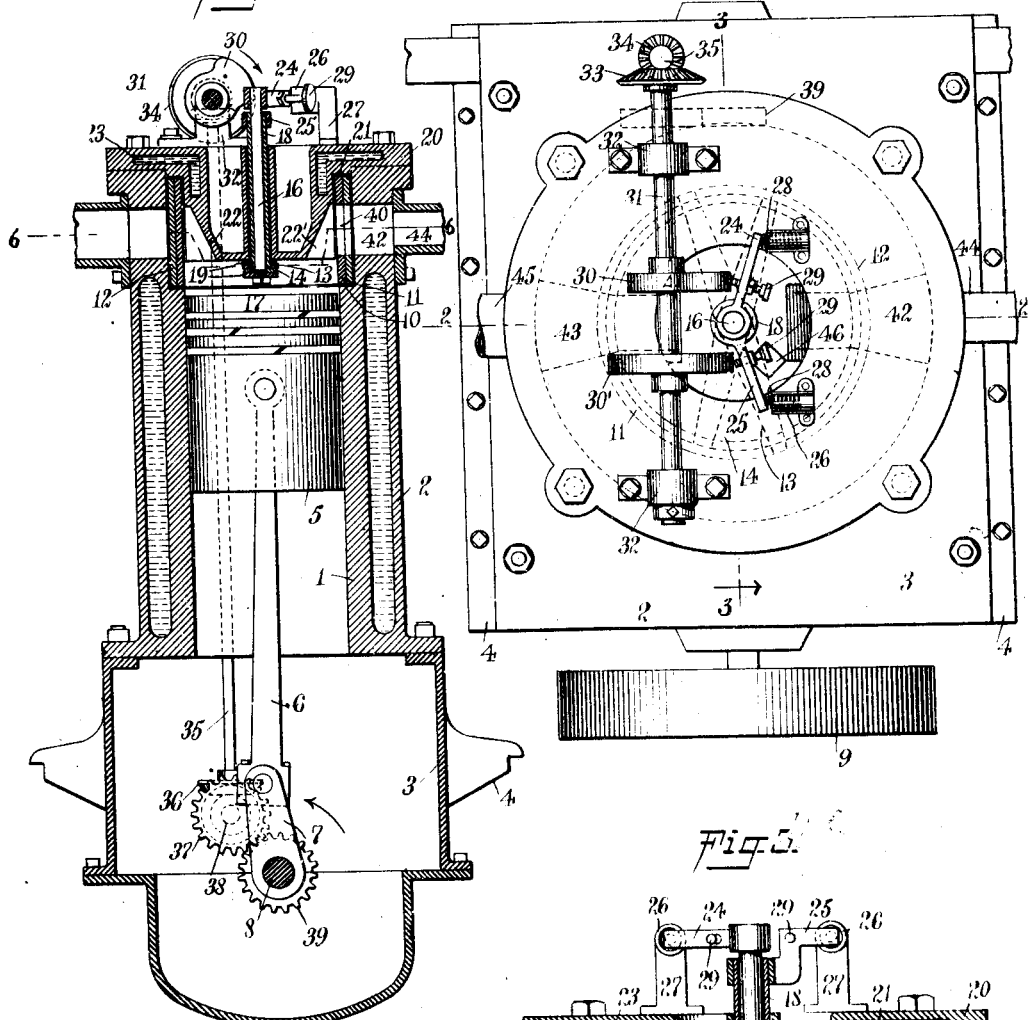
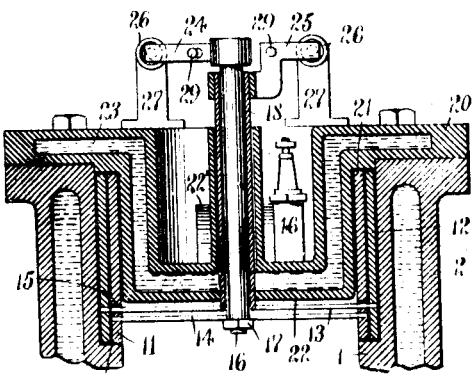
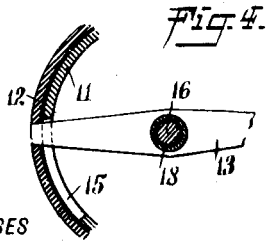
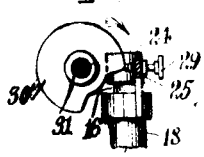
WITNESSES
INVENTOR
Charles W. Fowler
BY
ATTORNEYS C. W. FOWLER.
VALVE FOR INTERNAL COMBUSTION ENGINES.
APPLICATION FILED MAY 7, 1912.

1,117,020.

Patented Nov. 10, 1914.
2 SHEETS—SHEET 2.

WITNESSES
William P. Goebel
Wm. F. Nickel

INVENTOR
Charles W. Fowler
BY Munn & Co
ATTORNEYS

UNITED STATES PATENT OFFICE.

CHARLES WESLEY FOWLER, OF LYNDON, KENTUCKY.

VALVE FOR INTERNAL-COMBUSTION ENGINES.

1,117,020.  Specification of Letters Patent.  Patented Nov. 10, 1914.

Application filed May 7, 1912. Serial No. 695,614.

*To all whom it may concern:*

Be it known that I, CHARLES W. FOWLER, a citizen of the United States, and a resident of Lyndon, in the county of Jefferson and State of Kentucky, have invented a new and Improved Valve for Internal-Combustion Engines, of which the following is a full, clear, and exact description.

My invention relates to an improvement in valves for internal combustion engines, and the object thereof is to produce a construction of this sort which can be applied to almost any gas engine without the necessity of remodeling the same, and which will be perfectly easy and noiseless in operation and free from the other defects of the puppet valve type; and in which quick opening and closing of the ports are secured, owing to the long, narrow ports permissible in this type of valve.

Reference is to be had to the accompanying drawings forming a part of this specification, in which the same characters of reference indicate the same parts in all the views.

Figure 6:
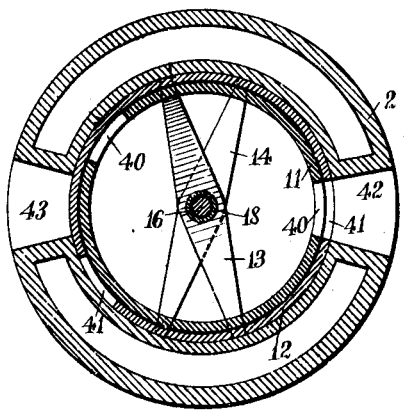
Figure 7:
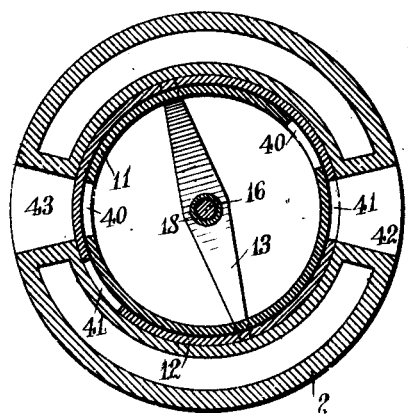
Figure 8:
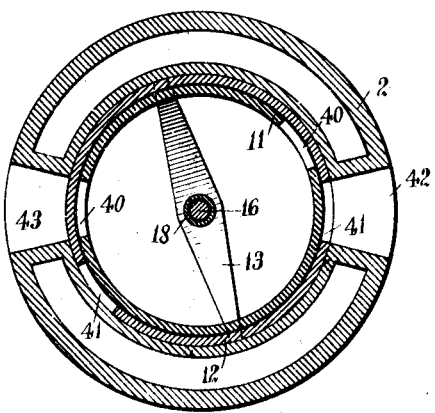
Figure 9:
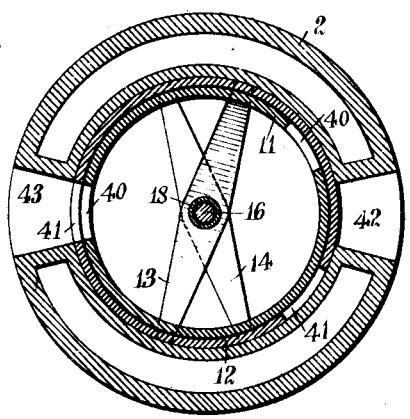

Figure 1 is a top plan of an internal combustion engine to which my valve mechanism is applied; Fig. 2 is a sectional view of an engine cylinder to which my valves are applied, the plane of section being indicated by the line 2—2 of Fig. 1; Fig. 3 is a sectional view through the head of an engine cylinder containing my improved valves, the plane of section being indicated by the line 3—3 on Fig. 1; Fig. 4 is a detail sectional view showing a preferred form of operating connection for the valves; Fig. 5 is another detail, showing one of the operating cams for the valves; Fig. 6 is a sectional view taken on the line 6—6 of Fig. 2, showing the valves in one operative position; and Figs. 7, 8 and 9 are similar sectional views in the same plane, showing the valves in other operative positions.

On the drawings the numeral 1 represents a working cylinder inclosing a firing chamber, this cylinder being surrounded by the usual water jacket 2.

3 is a crank case upon which the cylinder 1 is mounted, and this case is provided with ribs 4, which engage and rest upon a support.

Inside of the cylinder 1 reciprocates a piston 5, and this piston is connected by a rod 6 to a crank 7 mounted upon a power shaft 8. This power shaft carries the usual flywheel 9.

In the top or working end of the cylinder 1 is formed a shoulder 10, this end of the cylinder being bored out so as to be of greater internal diameter than the piston 5; and this end of the cylinder receives a pair of cylindrical sleeves 11 and 12 which fit against the shoulder 10 and are of approximately the same combined thickness as the width of this shoulder, so that the internal diameter of the inner valve 11 is of approximately the same internal diameter as that of the cylinder 1. The valve 12 is operated by means of a cross-bar 13, and the inner valve 11 is operated by means of a similar cross-bar 14. The bar 13 passes through diametrically opposite slots 15 in the inner valve 11, and the outer ends of both the bars 13 and 14 are fixed to the valve sleeves 12 and 11, respectively, so as to turn them when these bars are actuated. The bar 14 is mounted upon a spindle 16, being secured to the same so that it cannot rotate on but must turn with the spindle 16, and is prevented from slipping off the end of this spindle by means of a binding nut 17 or it may be an integral part of the spindle 16.

18 is a sleeve surrounding the spindle 16, and secured to the other bar 13 by any means which will connect these two elements rigidly to each other, so as to compel them to move together.

Suitable washers shown at 19 may be employed on the inner ends of the spindles 16 and 18, one of these washers being located between the bars 13 and 14 and the other between the bar 13 and the cylinder head.

The numeral 20 represents the cylinder head which is hollow, as shown, in order to provide space for a cooling fluid, and this head has a shoulder 21 which fits inside of the enlarged bore of the cylinder 1.

22 is a central boss which projects inside of the inner valve sleeve 11, this boss being approximately of the same diameter as the internal diameter of the valve sleeve 11, so as to make a snug fit without causing the parts to bind. As shown in Figs. 2 and 3, the boss 22 is approximately cylindrical in shape, but it has recesses 22′ in its lateral face at points which lie adjacent the inlet and exhaust passage of the motor, so as not to interfere with the free inflow and outflow of the fluid.

The spindle 16 is actuated by means of an arm 24, rigidly secured to its outer end, and the tubular spindle 18 is actuated by means of a similar arm 25. These arms have their outer ends located adjacent tubular sockets 26, mounted upon standards 27 carried by the cylinder head 22; and these sockets carry springs 28, which engage the outer ends of the arms 24 and 25.

29 are adjustable bolts supported by the arms 24 and 25, which project into the path of a pair of cams 30 and 30', the cam 30 engaging the arm 24, and the cam 30' the arm 25, to operate the valve sleeves and thus control the inflow and outflow of gas to the firing chamber of the engine. The cams in question are mounted upon a shaft 31 carried in bearings 32 on the head of the cylinder, this shaft being actuated by a gear 33. This gear is engaged by a miter gear 34 upon a shaft 35, the shaft 35 extending parallel with the cylinder along the side thereof and terminating at its lower end in a miter gear 36. This gear 36 meshes with a similar miter gear 37 on a shaft 38, and this shaft 38 carries a gear which meshes with a gear 39 on the power shaft 8.

The valve sleeve 11 is provided with a pair of ports 40 arranged at less than 180° apart, and the valve sleeve 12 is provided with a pair of similarly-arranged ports 41, 42 represents the inlet port through the cylinder wall, and 43 the outlet port, which are connected to conduits 44 and 45, respectively. 46 is an ordinary igniter carried by the head 20. Normally the ports occupy the position shown in Figs. 7 and 8. The outer sleeve 12 will have one port 41 lying in registry with the inlet port 42, but this port will be closed on the inside by the sleeve 11, and the other port 41 of the sleeve 12 will be out of registry with the opposite or exhaust port 43, owing to the fact that the two ports 41 are not at opposite ends of a diameter. Similarly the valve sleeve 11 will have one port 40 located adjacent the exhaust port 43, but communication between the ports 40 and 43 will be closed by the wall of the outer valve sleeve 12. The other port 40 of the sleeve 11 will be out of registry with the inlet 42, owing to the fact that the two ports 40 are not diametrically opposite each other, but are located similarly to the ports 41.

The operation of my improved form of valve gearing will now be described.

The shaft 30 operates at half the speed, as is usual with four-cycle engines, and Fig. 6 represents the valves in position to admit fuel; Fig. 7 represents the valves in the position they occupy during compression; Fig. 8 during expansion, and Fig. 9 represents the exhaust. To admit fuel the cam 30 pushes the arm 24 against its spring 28 to move the arm and the cross-bar 14, together with the inner sleeve 11, clockwise. This brings one of the ports 40 into registry with the port 42 and the adjacent port 41, to allow fuel to enter through the conduit 44 into the cylinder, the piston being on its out stroke at this time. As soon as the cam 30 passes the projection 29 on the arm 24, the spring 28 will move the arm to turn the spindle 16 and carry the cross-bar 14 and the inner valve sleeve 11 back to their original positions, cutting off the communication between the passage 42 and the port 41 to the inside of the cylinder, as shown in Figs. 7 and 8. This position of the parts continues during the compression and firing strokes, but on the next stroke the cam 30' releases the arm 25 and this arm is then moved clockwise by means of the spring 28, to turn the cross-bar 13 and the outer valve 12 into the position shown in Fig. 9. This carries the port 41 adjacent the passage 43 into registry with the exhaust passage, so that the gases can flow out through the port 40, port 41 and the passage 43, as shown in Fig. 9. As soon as the exhausting is finished the cam 30' will move the arm 25 back to its original position against the spring 28, and close the exhaust passage.

It will be seen that the cam 30 has a projection thereon, and the cam 30' a recess therein. The cam 30 operates the arm 24 to turn the inner valve to position to admit fuel; and the spring engaging the arm 24 returns it to its original position to cut off the inlet passage and put the opposite port 40 into position to register with the exhaust passage 43 when the other valve 12 is actuated. The cam 30' permits the arm 25 to be actuated by the spring 28 to move the outer valve into position to allow the exhaust to take place through the passage 43 and adjacent ports 40 and 41, and is returned to its starting position by the action of the cam 30', after the recess therein has passed the adjustable bolt 29 carried by the arm 25. It will be noted that the head 22 fits into the inner valve 11 a considerable distance, the amount being governed by the volume allowed for compression space, and that this head contains a cavity for cooling water, shown at 23; and as the bars 13 and 14 are located near the inner end of the head they will be subjected to the cooling effect of the water which the head contains. It is further to be noted that my valve construction will run smooth and noiselessly, and the wear thereon will be reduced to a minimum. At the same time, my invention can be applied to almost any two or four-cycle engine now on the market without the necessity of re-modeling the same, merely by boring out the head end of the same to form the shoulder 10, against which the valves 11 and 12 fit.

In adapting my valve for use on twocycle engines, I can make an engine of this type having a detachable head, close the inlet and exhaust ports and then form the shoulder 10 to receive the valves 11 and 12.

The cylindrical valves which I show and describe can of course be operated by other gearing than the type shown, the mechanism employed to operate the same being immaterial. Furthermore, the ports 40 and 41 in the cylindrical valves are so positioned that they never open both the inlet and exhaust openings 42 and 43 at the same time. It is not essential that the inlet and exhaust ports 42 and 43 be 180° apart, but merely structurally convenient to locate them in such relation; and it is this form that I illustrate on the drawings.

I wish to have it understood that the above description is illustrative only, disclosing but one embodiment of my invention, and that I do not care to be limited to the details thereof, but reserve to myself the right to make whatever changes in the shape, size and arrangement of the parts fairly fall within the scope and spirit of my invention.

Having thus described my invention, I claim as new and desire to secure by Letters Patent:

1. A valve construction for internal combustion engines, comprising a pair of hollow cylindrical valves having telescoping engagement with each other, a cross-bar for operating each of said valves located within the same, and means for operating said cross-bars to turn the valves independently, the inner valve having slots through which the bar for the outer valve passes.

2. In an improvement of the kind described, the combination of a pair of hollow cylindrical valves, one of said valves having telescoping engagement with the other, a power cylinder inclosing said valves, said power cylinder having inlet and exhaust passages, and each of said valves having a pair of ports extending laterally therethrough, means for holding one of the said valves in position to keep one of the ports thereof in alinement with one of the passages, means for holding the other valve in position to keep one of its ports in alinement with the other of the said passages, and means for operating each of said valves by turns to bring its other port into registry with the alined port of the other valve to open communication to the interior of the power cylinder through said passages.

3. In an improvement of the kind described, the combination of a pair of hollow cylindrical valves having telescoping engagement with each other, a cylinder having a power chamber receiving said valves, said cylinder having a passage therethrough, each of said valves having a port extending through the wall thereof, means for normally holding one of said valves in position to retain its port in alinement with said passage, and means for operating the other valve to bring its port into registry with the said passage and the alined port of the first valve to open communication to the interior of said cylinder.

4. In an improvement of the kind described, the combination of a cylinder having a power chamber, a pair of hollow cylindrical valves having telescoping engagement with each other located within said power chamber, said cylinder having inlet and exhaust passages, the outer of said valves having a pair of ports, means for holding said valves to keep one of said ports in alinement with the inlet passage, the inner valve also having a pair of ports, means for holding said valve in position to keep one of its ports in alinement with the exhaust passage, means for operating the inner valve to bring its other port into registry with the first-named port of the outer valve, and the inlet passage to establish communication with the inside of the cylinder, and means for operating the outer valve to bring its other port into communication with the first-named port of the inner valve to establish communication between the exhaust passage and the inside of said cylinder.

5. In an improvement of the kind described, the combination of an oscillatable valve, a stem for operating the same, an arm on said stem, an adjustable projection carried by said arm, means for engaging said projection to move the arm to actuate the valve in one direction, and a socket having a spring therein for engaging the outer end of said arm to move the valve in the opposite direction.

6. In an internal combustion engine, the combination of a cylinder head having a central bearing, a pair of cylindrical valves associated with said head and arranged one within the other, operating shafts passing through the bearing in the head and connected to the valves, a shaft mounted upon said head and provided with cams, and means actuated by said cams for operating the valves, whereby the head, the valves and the last-named shaft can be removed as a unit.

7. In an internal combustion engine, the combination of a cylinder, a pair of cylindrical valves in said cylinder, one of said valves being contained by the other valve, means for operating the one valve, and means having a portion projecting through the wall of one valve and engaging the other valve for operating the other valve.

8. In an internal combustion engine, the combination of a pair of valves, one of said valves being located adjacent the other valve, a cylinder inclosing the valves and having a pair of passages through its walls, each of said valves having a pair of ports out of diametric alinement, a port of one valve being normally in alinement with one of said passages and a port of the other valve being normally in alinement with the other passage, and means for bringing the other port of either of said valves into registry with the alined port of the other valve.

9. In an internal combustion engine, the combination of a cylinder having a head at one end, the bore of said cylinder being enlarged at said end, a pair of cylindrical sleeve valves in the enlarged portion of the bore at the head end of the cylinder and arranged one within the other, the cylinder head extending inside the inner sleeve valve, the cylinder having a pair of passages through its walls, and each of said valves having a pair of ports out of diametric alinement, one port of one valve being normally in alinement with one of said passages, and one port of the other valve being normally in alinement with the other passage, and means for operating said valves to bring the other port of either valve into registry with the alined port of the other valve.

10. In an internal combustion engine the combination of a cylinder having a head at one end, the bore of said cylinder being enlarged at said end forming a shoulder, a pair of cylindrical valves fitted in the enlarged portion of the bore and arranged one within the other, the internal diameter of the inner valve being of approximately the same internal diameter as that of the body of the cylinder, the cylinder having an inlet and an exhaust passage and the cylinder head projecting inside the inner valve, each of said valves having a pair of ports out of diametric alinement, one port of one valve being normally in alinement with one of said passages of the cylinder, and one port of the other valve being normally in alinement with the other passage, and means for operating each of said valves by turns to bring its other port into registry with the alined port of the other valve, and to return the valve to its normal position.

In testimony whereof I have signed my name to this specification in the presence of two subscribing witnesses.

CHARLES WESLEY FOWLER.

Witnesses:
 JURT H. LUEST.
 S. E. FORD.